Sept. 10, 1929.　　　J. C. McCUNE　　　1,727,404
ELECTROPNEUMATIC BRAKE
Filed Nov. 25, 1927
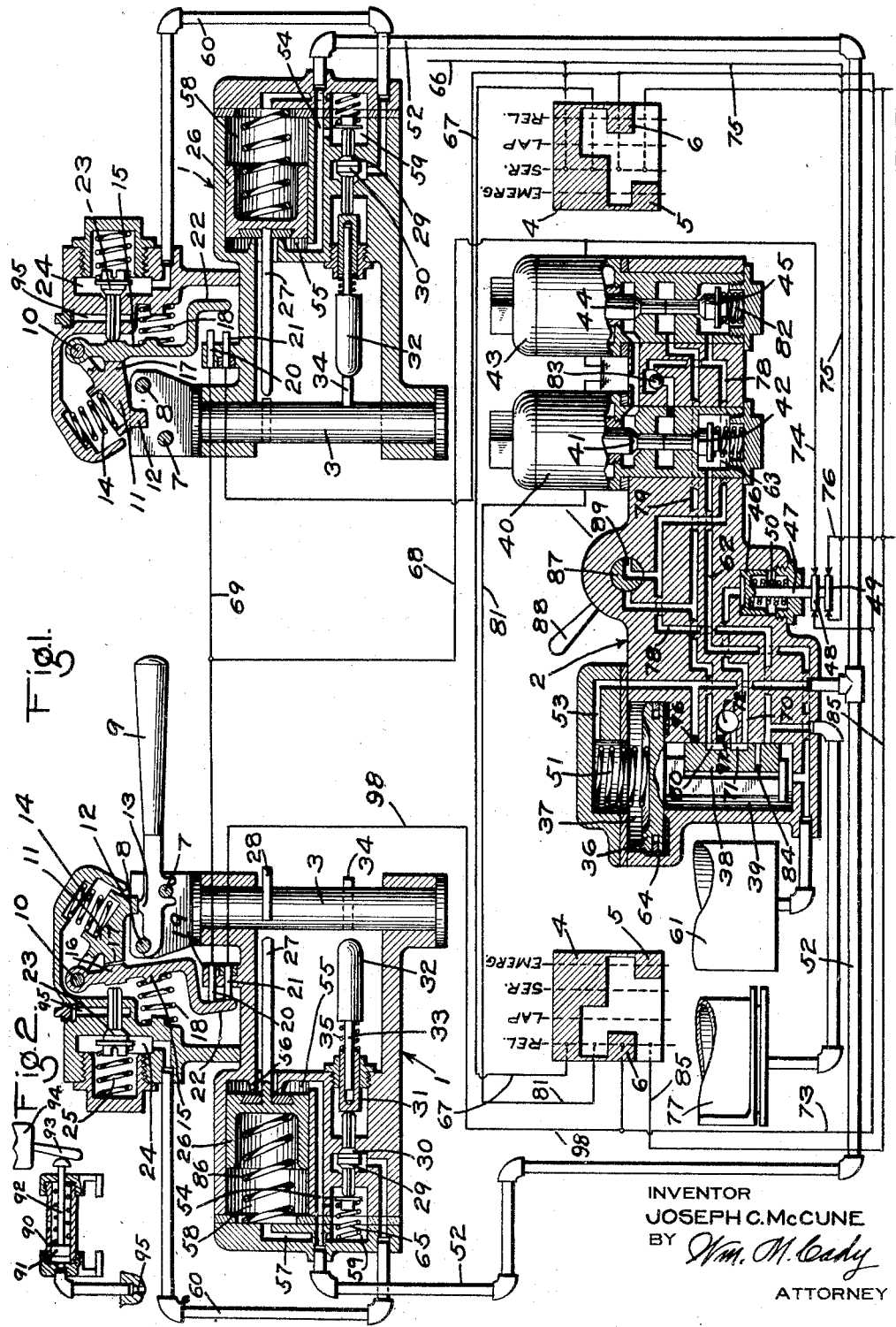
INVENTOR
JOSEPH C. McCUNE
BY Wm. M. Cady
ATTORNEY Patented Sept. 10, 1929.

1,727,404

UNITED STATES PATENT OFFICE.

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed November 25, 1927. Serial No. 235,450.

This invention relates to safety car and brake control apparatus, and more particularly to an equipment in which the brakes are applied and the power is cut off when the operator becomes disabled.

One object of my invention is to provide a safety control equipment in which the safety or "dead man" feature is associated with the brake controlling device instead of with the power controller handle.

Another object of my invention is to provide means for controlling the brakes pneumatically, in case of failure of electric control.

Another object of my invention is to provide an improved safety car "dead man" control handle.

Another object of my invention is to provide an improved safety car control equipment in which by employing electric control, the piping required is reduced.

Other objects and advantages will appear in the following more detailed description of the invention.

In the accompanying drawing; Fig. 1 is a diagrammatic view, mainly in section, of a safety car control equipment embodying my invention; and Fig. 2 a view of a circuit breaker cylinder device, which may be employed with the apparatus shown in Fig. 1.

The safety car control equipment shown in the drawing is of the double end type and comprises a combined brake switch and safety control device 1, one at each end of the car and a single electro-pneumatic brake controlling device 2.

The control device 1 comprises a casing in which a spindle or stem 3 is mounted to rotate. Associated with the stem 3 is a contact drum, having contacts 4, 5, and 6, shown developed, but for clearness of description, said drum has not been shown as actually applied to the stem.

The upper end of the stem 3 is slotted and carries a fulcrum pin 7 and stop pin 8 which extend across the slot. A removable handle 9 is provided, having a recess at its under side adapted to engage the pin 7 and a recess at its upper side adapted to engage the pin 8.

Pivotally mounted on a pin 10 secured in the casing is an arm 11 having a lug 12 adapted to be engaged by a lug 13 carried by the handle 9 and said arm is urged downwardly against the handle by a coil spring 14. Also pivotally mounted on the pin 10 is an arm 15 having a lug 16 adapted to engage a lug 17 on the arm 11 and subject to the pressure of a coil spring 18 urging said arm toward the arm 11.

Carried by a lug 19 associated with the casing are insulated contacts 20 and 21 adapted to be bridged by a contact portion 22 carried by arm 15. A pilot valve 23 contained in valve chamber 24 is provided with a stem adapted to be engaged by the arm 15, the valve 23 being urged to its seat by a spring 25. Mounted in a cylinder portion of the casing is a relay valve piston 26 having a stem 27 which extends toward the stem 3 and the end of which is adapted to be engaged by a cam section 28 carried by said stem.

Mounted in a valve chamber of the casing are double heat valves 29 and 30, the valve 30 having a stem in engagement with a sliding plunger 31. A stem 32 is provided with a pin 33 which extends into a bore of the plunger 30 and the stem 32 is adapted to be engaged by a cam 34 carried by the stem 3. A spring 35 is interposed between the stem 31 and the pin 32 and permits relative movement between the stem 32 and the plunger 31.

The electro-pneumatic brake controlling device 2 may comprise a casing having an emergency valve device comprising a piston 36 contained in piston chamber 37 and subject to the pressure of a spring 51. A slide valve 38 contained in valve chamber 39 is adapted to be operated by piston 36.

Associated in the casing is a service magnet valve device comprising a magnet 40 and valves 41 and 42 controlled by said magnet and a release magnet valve device comprising a magnet 43 and valves 44 and 45 adapted to be controlled by the magnet 43.

Also mounted in the casing is a piston 46 having a stem 47 which carries bridging contact members 48 and 49, the piston 46 being subject to the pressure of a spring 50.

A safety control pipe 52 is connected through passage 53 with piston chamber 37 and said pipe extends to the opposite ends of the car and is connected through a passage 54 with chamber 55 at the outer face of the valve piston 26. A seat rib 56 is adapted to engaged a seat on the face of piston 26, the area within the seat rib being open to the atmosphere and the area outside the seat rib being subject in the seated position to the pressure in chamber 55. A passage 57 leads from passage 54 to chamber 58 at the spring side of piston 26 and also opens into a chamber 59, which chamber is connected, when valve 29 is unseated, with a pipe 60 leading to valve chamber 24.

A main reservoir 61 or other source of fluid under pressure is connected to valve chamber 39 and through passage 62 with valve chamber 63 and in operation, fluid under pressure equalizes from valve chamber 39 through a feed groove 64 to piston chamber 37. With the handle 9 at the operating end of the car held depressed in release position, as shown at the left of Fig. 1, the cams 34 and 28 are out of engagement with the stems 32 and 27 respectively, so that the valve 30 is permitted to seat while the valve 29 is unseated by spring 65.

Communication is thus established from the control pipe 52 to pipe 60. With the handle 9 held depressed, the lug 13 acts in the lug 12 and holds the arm 11 in position so that the lug 17 will not engage the lug 16. As a consequence, the spring 18 moves the arm 15 to a position permitting the valve 23 to be held seated by spring 25 and at the same time the contact portion 22 bridges the contacts 20 and 21.

The valve 23 being held seated, fluid pressure from piston chamber 37 charges the control pipe 52 and the fluid pressures upon opposite sides of piston 36 equalizing by flow through the feed groove 64, the spring 51 operates to maintain the piston 36 and slide valve 38 in release position, as shown in the drawing.

In the handle off position of the stem 3, the brake switch drum is in service position, as shown at the right of Fig. 1, and in this position, a current supply wire 66, which is provided only at one end of the car is connected to a contact finger of the brake switch, which engages the drum contact 4 in all positions, and a contact finger connected to a wire 67 also engages the contact 4 in service position. The wire 67 is connected to a contact finger of the switch drum at the other end of the car, which finger engaged the contact 4 in all positions of the switch drum.

It will thus be seen that the contacts 4 at both ends of the car are connected to the source of current at one end of the car, when the switch drum at the end of the car having the current supply wire is in service position.

The release magnet is connected to a wire 68 which is connected to wire 69 and the wire 69 is conncted to the contact members 20 at each end of the car.

The contact member 20 being connected through contact portion 22 with the contact member 21, when the handle 9 is held depressed, the release magnet 43 will be energized, if the switch drum at the operating end of the car is in release position by way of wire 98, which is connected to a contact finger of the switch drum and contact 6 of the switch drum, which is electrically connected to the contact 4.

With the emergency piston 36 in release position, passage 70, leading to the face of piston 46 is connected through cavity 71 in slide valve 38 with an exhaust port 72 and the piston 46 being subject to atmospheric pressure, the spring 50 maintains piston 46 in its upper position, in which bridging switch member 48 connects wire 73, leading to contact 6, with wire 74, leading to the release magnet 43. It will thus be seen that magnet 43 is also energized by current supplied through the switch member 48, when the emergency piston is in release position.

The bridging switch member 49 connects wire 75, leading to the current supply wire 66, with a wire 76 connected to a holding coil (not shown), the holding coil being adapted when energized to maintain the power circuit closed and when deenergized to effect the opening of the power circuit.

With the release magnet 43 energized, the brake cylinder 77 is connected to the atmosphere, through passage 78, past the open valve 45, passage 79, cavity 80 in slide valve 38 and exhaust port 72.

To effect a service application of the brakes, the brake switch handle 9 is turned to service position, in which a contact finger connected to wire 81, engages drum contact 4. The wire 81 is connected to the service magnet 40, so that said magnet is energized. At the same time, the circuit through the finger connected to wire 98 is opened, so that the release magnet 43 is deenergized and thereby the valve 45 is moved to its seat by spring 82, thus cutting off communication from the brake cylinder 77 to the atmosphere.

The service magnet 40 being energized, the valve 41 is moved to its seat, while the valve 42 is unseated. The unseating of valve 42 permits the flow of fluid under pressure from the main reservoir 61 to the brake cylinder 77, through passage 62, past the open valve 42 and past the check valve 83, to passage 78 and thence to the brake cylinder.

When the desired pressure has been obtained in the brake cylinder, the handle 9 is turned to lap position, in which the circuit through the wire 81 is opened, so that the service magnet is deenergized. The valve 42 is then moved to its seat, preventing the further supply of fluid under pressure to the brake cylinder. The release magnet 43 remains deenergized in lap position, so that fluid under pressure is prevented from being vented to the atmosphere.

In service position, the cam 34 engages the stem 32 and said stem is operated to seat the valve 29 and unseat the valve 30. The seating of valve 29 cuts off communication from pipe 52 to pipe 60, so that with the brake switch handle 9 in service position, the handle may be released by the operator without causing an emergency application of the brakes, since fluid cannot be vented from pipe 52, leading to emergency piston chamber 37, by the opening of valve 23.

If the operator wishes to effect an emergency application of the brakes, he moves the handle 9 to emergency position, in which the cam 28 engages the stem 27. The stem 27 is then shifted so as to unseat the valve piston 26 and permit the venting of fluid from pipe 52 through the atmospheric opening around the stem 27.

The venting of fluid from pipe 52 causes the emergency piston 36 to be shifted to its outer position by the fluid pressure in valve chamber 39 and the slide valve 38 is thus moved so as to uncover passage 78 and permit the supply of fluid under pressure from the main reservoir 61 to the brake cylinder.

In emergency position, a port 84 through slide valve 38, registers with passage 70, so that fluid under pressure is supplied to piston 46. Said piston is then shifted so as to open the circuit to the holding coil and thereby effect the opening of the power circuit and also to open the circuit of the release magnet 43.

With a manually effected emergency application of the brakes, it may not be desired to open the power circuit and while the circuit to the holding coil is opened at the switch contact 49, for a purpose to be hereinafter described, the circuit to said coil is closed through a wire 85 which directly connects with the holding coil wire 76 and which leads to a contact finger of the switch drum. Said contact finger, in the emergency position of the switch drum, engages a drum contact 5 which is electrically connected with the energized contact 4, so that under the above condition, the holding coil is maintained energized.

To release after an emergency application of the brakes, the handle 9 is turned to release position. In this position, the release magnet 43 is energized through the wire 98, although the piston 46 may still be holding the contact member 48 in its open position.

The movement of the handle 9 to release position permits the stem 27 to move so that the valve piston 26 is moved to its seat by spring 86. The release magnet 43 being energized, the valve 45 is unseated and the brake cylinder passage 78 is connected to passage 79. With the emergency slide valve 38 in emergency position, passage 78 is opened to valve chamber 39, so that fluid under pressure is supplied from the main reservoir to passage 78 and thus to passage 79. Passage 79 is connected in emergency position of slide valve 38 through cavity 80 with a passage leading to passage 53, so that the piston chamber 37 is charged with fluid under pressure, as well as the pipe 52. When the pressure in chamber 37 has been increased to a predetermined degree, the spring 51 shifts the piston 36 to release position, in which the brake cylinder is connected to the exhaust port 72, as hereinbefore described.

If the operator should release the handle 9, the arm 11 will be operated by the spring 14 to move the arm 15 so as to cause the valve 23 to be unseated. Fluid is then vented from chamber 58, through passage 57, past the open valve 29, and pipe 60.

The fluid pressure in chamber 55 then operates to shift the valve piston to the left so as to open communication from pipe 52 to the atmosphere. The fluid pressure in piston chamber 37 being thus reduced, the emergency piston 36 is shifted to emergency position to effect an emergency application of the brakes, as hereinbefore described. The piston 46 is also shifted, so as to open the circuit of the release magnet 43 and also the circuit to the holding coil, so that the power circuit is opened, it being noted that when an emergency application of the brakes is effected by releasing the handle 9, with the switch drum in any position except emergency position, the power circuit will be opened. The release of the handle 9 also causes the contact portion 22 to move so as to open the release magnet circuit at the contact members 20 and 21.

In case the service magnet should become inoperative, by the service magnet coil burning out or through leakage of wires or the like, an emergency application may be effected either by moving the switch drum to emergency position, or by releasing the handle 9, the control pipe 52 being vented in either case, as hereinbefore described. Release after an emergency application if there is failure of the release magnet, due to its magnet coil being burned out or a broken wire, cannot be effected in the manner hereinbefore described, since the release magnet 43 will remain deenergized when the switch drum is turned to release position, thus preventing the opening of valve 45, so as to permit the supply of fluid under pressure to piston chamber 37.

In order to release under the condition that the release magnet is inoperative, a valve 87 is provided, adapted to be operated by a handle 88. The valve 87 is normally held in the position shown in the drawing, but when it is desired to effect the release after an emergency application with no current available, the handle is turned to a position in which a port 89 therein connects passage 78 with passage 79. Fluid under pressure is then supplied from valve chamber 39 and the main reservoir 61, to passage 78 and through port 89 to passage 79 and thence through cavity 80 to passage 53, so that piston chamber 37 is charged with fluid under pressure and the piston 36 is consequently shifted to release position. In release position, cavity 80 connects passage 79 with exhaust port 72, so that fluid under pressure is released from the brake cylinder, since passage 78 is connected through port 89 with brake cylinder passage 78.

It will now be seen that the brakes may still be applied in emergency and also released after an emergency application of the brakes even if the electric brake control be inoperative.

Instead of employing a holding coil for effecting the opening of the power circuit when an emergency application of the brakes is made, a circuit breaker cylinder device 90 may be provided, containing a piston 91 having a stem 92 adapted, when fluid pressure is supplied to the piston, to actuate the arm 93 of a circuit breaking device 94 and thus effect the opening of the power circuit. The piston chamber of the piston is connected to a passage 95 in the safety controller handle device, such that when the pilot valve 23 is unseated, fluid under pressure will be supplied to said passage and thence to the piston 91.

With a circuit breaker cylinder employed at each end of the car, it will be noted that since the handle 9 is removed at the non-operating end in service position, the valve 29 will be held seated by the engagement of the cam 34 with the stem 32, so that communication from the control pipe 52 to the pipe 60 is cut off and consequently the circuit breaker cylinder at the non-operating end of the car remains in its inactive position while controlling the car from the operating end.

A choke plug 96, having a restricted port is placed in the passage leading from the seat of slide valve 38 to passage 53, so that the flow of fluid under pressure to piston chamber 37, when the valve 87 is held open, will not be sufficient to cause the pressure in said chamber to build up and effect the release movement of piston 36, so long as the control pipe 52 is maintained open to the atmosphere.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In an electro-pneumatic brake, the combination with a brake cylinder, of an electrically controlled valve device for controlling communication through which fluid is released from the brake cylinder, a handle, means controlled by said handle for controlling the circuit of said electrically controlled valve device, and means operated upon release of said handle for effecting an application of the brakes.

2. In an electro-pneumatic brake, the combination with a brake cylinder, of an electrically controlled valve device for controlling communication through which fluid is released from the brake cylinder, a handle, means controlled by said handle for controlling the circuit of said electrically controlled valve device and operated upon release of the handle for opening said circuit, and means operated upon release of said handle for effecting an application of the brakes.

3. In an electro-pneumatic brake, the combination with a brake cylinder, of an emergency valve device operated upon a reduction in fluid pressure for effecting an application of the brakes and an electrically controlled valve device for controlling communication through which fluid is released from the brake cylinder and also communication through which fluid under pressure is supplied to said emergency valve device.

4. In an electro-pneumatic brake, the combination with a brake cylinder, of an emergency valve device operated upon a reduction in fluid pressure for effecting an application of the brakes and an electrically controlled valve device for controlling communication through which fluid is released from the brake cylinder and also communication through which fluid under pressure is supplied to said emergency valve device, said emergency valve device also controlling the communication through which fluid under pressure is supplied to the emergency valve device.

5. In an electro-pneumatic brake, the combination with a brake cylinder, of an emergency valve device operated upon a reduction in fluid pressure for effecting an application of the brakes and an electrically controlled valve device for controlling communication through which fluid is released from the brake cylinder and also communication through which fluid under pressure is supplied to said emergency valve device, said emergency valve device also controlling the communication through which fluid under pressure is supplied to the emergency valve device and the communication through which fluid is released from the brake cylinder.

6. In an electro-pneumatic brake, the combination with a brake cylinder, of an emergency valve device having a release position in which communication is established through which fluid is released from the brake cylinder and operated upon a reduction in fluid under pressure for supplying fluid under pressure to the brake cylinder, and an electrically controlled valve device for also controlling communication through which fluid is released from the brake cylinder.

7. In an electro-pneumatic brake, the combination with a brake cylinder, of an emergency valve device having a release position in which communication is established through which fluid is released from the brake cylinder and operated upon a reduction in fluid under pressure for supplying fluid under pressure to the brake cylinder, and an electrically controlled valve device for also controlling communication through which fluid is released from the brake cylinder and for controlling communication through which fluid under pressure is supplied to said emergency valve device.

8. In an electro-pneumatic brake, the combination with a brake cylinder, of an emergency valve device having a release position in which communication is established through which fluid is released from the brake cylinder and movable upon a reduction in fluid pressure to application position in which fluid under pressure is supplied to the brake cylinder and an electrically controlled valve device for also controlling communication through which fluid is released from the brake cylinder and for controlling communication through which fluid under pressure is supplied to said emergency valve device.

9. In an electro-pneumatic brake, the combination with a brake cylinder, of an electrically controlled valve for connecting the brake cylinder to a passageway, a piston, a valve operated by said piston and adapted in one position to connect said passageway to the atmosphere and in another position to said piston.

10. In a safety control brake, the combination with electrically controlled means for effecting the application and release of the brakes, means for controlling the circuits of said electrically controlled means, and a handle for operating said controlling means, of means operated upon release of the handle for effecting an emergency application of the brakes.

11. In a safety control brake, the combination with an electro-magnet controlled valve means for controlling the release of the brakes, an electro-magnet controlled valve means for controlling the application of the brakes, a switch drum for controlling the circuits of said electro-magnet controlled valve means, and a handle for operating said drum, of means operated upon release of said handle for effecting an emergency application of the brakes.

12. In a fluid pressure brake, the combination with a valve device operated upon a reduction in fluid pressure for effecting an application of the brakes and upon an increase in fluid pressure for effecting the release of the brakes, of electrically controlling means operative to supply fluid under pressure to said valve device and valve means operative manually for also supplying fluid under pressure to said valve device.

13. In a fluid pressure brake, the combination with an emergency valve device having valve means for controlling the application and release of the brakes and a piston operated upon a reduction in fluid pressure for operating said valve means to apply the brakes and upon an increase in fluid pressure for operating said valve means to release the brakes, of electrically controlled valve means for supplying fluid under pressure to said piston and a hand operated valve also operative to supply fluid under pressure to said piston.

14. In a fluid pressure brake, the combination with a valve device operative to effect an emergency application of the brakes, of means having an emergency position in which said valve device is operated to effect an emergency application of the brakes, a handle for operating said means, and means operated upon release of said handle for also effecting the operation of said valve device and for opening the power circuit.

15. In a fluid pressure brake, the combination with a valve device operative to effect an emergency application of the brakes, of means having an emergency position in which said valve device is operated to effect an emergency application of the brakes, a handle for operating said means, and means operated upon release of said handle for also effecting the operation of said valve device and for opening the power circuit, the power circuit not being opened when an emergency application of the brakes is effected by movement of said handle to emergency position.

16. In a fluid pressure brake, the combination with a valve device operative to effect an emergency application of the brakes and means operated upon movement of said valve device to effect an emergency application of the brakes for opening the power circuit, of a handle means operated upon release of said handle for effecting the operation of said valve device, and means operated upon movement of said handle in another direction for also effecting the operation of said valve device and for maintaining the power circuit closed.

17. In a fluid pressure brake, the combination with a valve device operative to effect an emergency application of the brakes and means operated upon movement of said valve device to effect an emergency application of the brakes for opening the power circuit, of a handle, means operated upon release of said handle for effecting the operation of said valve device, and means operated upon movement of said handle in another direction for also effecting the operation of said valve device and for maintaining the power circuit closed, independently of said power circuit controlling means.

18. In a safety control brake, the combination with a valve device for effecting an emergency application of the brakes and a switch device controlled by said valve device and operative to open a circuit to a holding coil by which the power circuit is opened, of a handle, means operated upon release of said handle for effecting the operation of said valve device, means operated by rotation of said handle for also effecting the operation of said valve device, and switch means operated by rotation of said handle for closing said holding coil circuit.

19. In a safety control brake, the combination with a control pipe and a valve device operated upon a reduction in control pipe pressure for effecting an emergency application of the brakes, of a handle, a valve operated upon release of the handle for venting fluid under pressure from said pipe, means for controlling the application and release of the brakes and having a service application position, and means operated only in said service application position for closing communication through said pipe from said valve device to said valve.

20. In a safety control brake, the combination with a control pipe and a valve device operated upon a reduction in control pipe pressure for effecting an emergency application of the brakes, of a handle, a valve operated upon release of the handle for venting fluid under pressure from said pipe, means for controlling the application and release of the brakes and having a service application position, a second valve operative to close communication through said pipe from said valve device to the first mentioned valve, and means operative only in said service position for closing said second valve.

21. In an electro-pneumatic brake, the combination with electrically controlled devices for controlling the application and release of the brakes, of a switch drum at each end of the car for controlling the circuits of said devices, current being supplied to the switch drum at one end of the car through the switch drum at the other end of the car.

22. In an electro-pneumatic brake, the combination with electrically controlled devices for controlling the application and release of the brakes, of a switch drum at each end of the car for controlling the circuits of said devices, current being supplied from a current supply wire to the switch drum at one end of the car through the switch drum at the other end of the car, when said last mentioned switch drum is in a certain position.

23. In an electro-pneumatic brake, the combination with electrically controlled devices for controlling the application and release of the brakes, of a switch drum at each end of the car for controlling the circuits of said devices and having a brake application position, a current supply wire, current from which is supplied to the switch drum at one end of the car through the switch drum at the other end of the car, when the last mentioned switch drum is in application position.

24. In a safety car control brake, the combination with a control pipe and a valve device operated upon a reduction in pressure in said pipe for effecting an application of the brakes, of a valve for venting fluid from said pipe, a pivoted arm movable to operate said valve, a pivoted arm movable to operate the first arm, a spring for moving the second arm, and a handle operating when depressed to move the second arm in opposition to the spring.

25. In a safety control brake, the combination with a depressible handle, of means operative to effect an emergency application of the brakes, a valve for effecting the operation of said means, and means operative upon release of said handle for operating said valve and comprising a pivoted arm for operating said valve, a second pivoted arm for operating the first pivoted arm, a spring urging the second arm into engagement with the first arm, the second arm being moved out of engagement with the first arm upon depression of said handle.

In testimony whereof I have hereunto set my hand.

JOSEPH C. McCUNE.